Jan. 26, 1954  W. E. BUCK  2,667,104
LIGHT VALVE
Filed Dec. 13, 1950

WITNESSES:
Ralph Carlisle Smith
Denmith F. Ross

INVENTOR.
WILLARD E. BUCK
BY
Roland A. Anderson
Attorney

Patented Jan. 26, 1954

2,667,104

UNITED STATES PATENT OFFICE 2,667,104

LIGHT VALVE

Willard E. Buck, Los Alamos, N. Mex., assignor to the United States of America as represented by the United States Atomic Energy Commission Application December 13, 1950, Serial No. 200,602

2 Claims. (Cl. 88—61)

This invention relates broadly to non-current consuming apparatus for visually indicating variable voltages and, more particularly, it relates to a piezoelectric crystal operated oscillograph.

In general, the only satisfactory instruments available in the prior art for translating voltages into visible traces in the range of zero to 100 volts and frequency between 1,000 and 50,000 cycles per second without imposing a load on the voltage source in the cathode-ray oscilloscope. The application of this instrument to low voltages of the order of 50 volts and below is hindered by inherent insensitivity and lack of linearity. In addition, the cathode-ray oscilloscope is not convenient for portable use in view of its bulky and weighty construction.

It is therefore an object of this invention to provide an apparatus for translating voltages into visible traces without imposing a load on the voltage source.

It is another object of this invention to provide a simple and compact apparatus for translating voltages in a non-current consuming manner into visible indications.

It is still another object of this invention to provide a non-current consuming oscillograph which has a high degree of accuracy, particularly in its application to the measurement of small voltages.

These and other objects are obtained by an electro-optical apparatus which utilizes the light interference phenomena of the wedge-shaped film. To this end, one boundary of the wedge-shaped film is a piezoelectric crystal and the other boundary is the surface of a transparent material such as glass in plate form. The interference fringe effect is enhanced by coating the adjacent faces of the plate glass and piezoelectric crystal to form approximately 90 per cent reflecting surfaces. It follows from the foregoing that if the assembly is viewed from an angle acute with respect to the normal to the plate glass and at the same time monochromatic light is impinged on the assembly from an angle approximately equal to the viewing angle on the opposed side of the normal to the plate glass, changes in the thickness of the wedge as by the impression of a potential to the piezoelectric crystal will be observed as a proportionate translation of the fringes. Measurement of the amount of translation of the fringes is then a measurement of the potential applied to the crystal.

In order to derive a trace corresponding to an observed varying potential it is necessary to project the resulting fringes either with lateral translation or on a film which is being translated. To obtain an immediately visible trace a rotating mirror can be positioned in the line of sight of the electro-optical fringe producing system. To the end that a permanent record is secured, the fringe effect can be projected on a film moving at right angles to the plane of motion of the fringes. The invention can best be understood by further explanation with reference to the drawing made a part of this specification. In the drawing:

Figure 1:
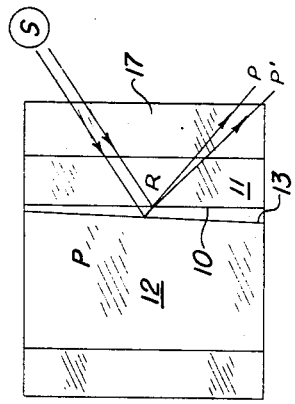
Figure 1 is a top view showing schematically a preferred embodiment of the electro-optical components of the apparatus constructed in accordance with this invention.

Referring to Figure 1, the surface 10 is the coated, partially reflecting surface of a sheet of plate glass 11. A piezoelectric crystal 12 is provided with a chamfered edge 13 which is also coated to form a partially reflecting surface. Since the adjacent surfaces of the plate glass and the piezoelectric crystal are not in parallel planes, the surfaces define a wedge-shaped film. It follows that if a source S of monochromatic light impinges at an angle on the interference fringe component thus far described, interfering rays are produced and these interfering rays do not enter the eye parallel to each other but appear to diverge from a point P near the wedge-shaped film of air. The two surfaces defining the wedge-shaped film are preferably plane so that the fringes are straight and parallel to the thin edge of the wedge. Since the position of the fringes is related to the distance between the plate glass and the crystal surface, it follows that a physical translation of the crystal due to the application of a voltage thereto causes a translation of the fringes toward the thin edge of the wedge.

Figure 3:
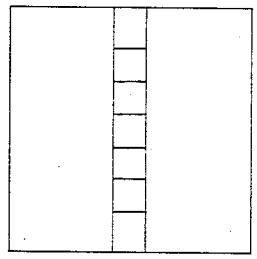
Figure 3 is a chart showing the appearance of the fringes formed by the apparatus as seen by the eye in monochromatic light.
Figure 2:
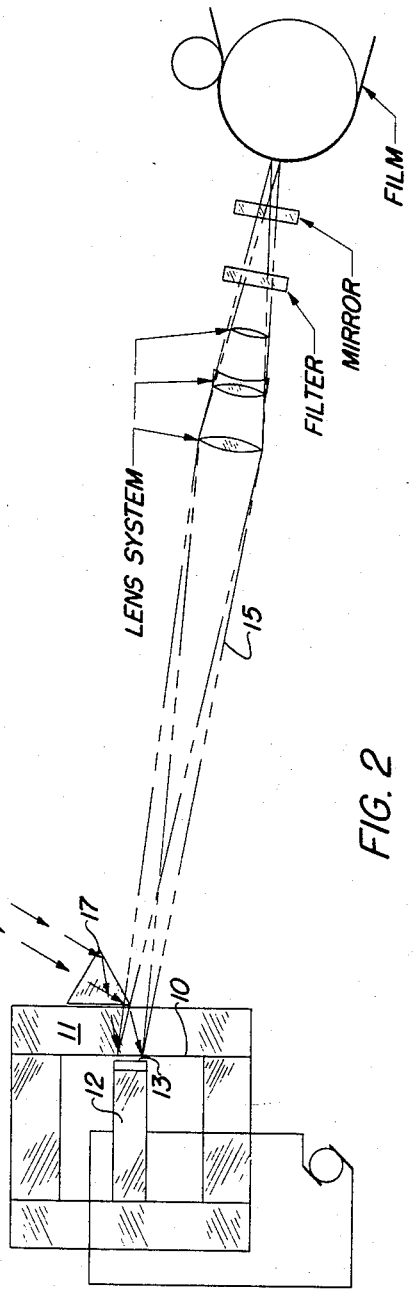
Figure 2 is an end view of the electro-optical arrangement of Figure 1 shown in combination with an optical viewing system for observing excursions of the interference fringes as a result of impressed potentials.

Referring to Figure 2, for a complete, practical embodiment of this invention, the plate glass 11 is shown disposed at one end of a chamfer-cut piezoelectric crystal 12. The adjacent surface 13 of the crystal is silvered to give a 90 per cent reflecting surface. The adjacent surface 10 of the plate glass element 11 is likewise silvered with approximately a 90 per cent reflecting surface. There is thus formed between the adjacent surfaces, a wedge-shaped film which under the impression of light thereon will cause interference fringes to be formed. A source of light S and an optical viewing system 15 are shown in combination with the interference fringe component. A prism 17 is cemented to the glass plate with one edge near the center of the plate to direct light nearly perpendicularly on the two reflecting surfaces and to define the size of the image.

Light from the source S is partially reflected from the surface 10 of the plate glass element while the light passing through the surface 10 and the wedge-shaped film is reflected from the surface 13 of the piezoelectric crystal and the image of the interference pattern thus formed is progressively recorded on the film either by moving the film or by translating the image by means of a rotating mirror placed between the crystal and the film. It is thus seen that a change in the thickness of the wedge is recorded on the film as a function of the applied voltage.

The piezoelectro voltmeter of the invention can be constructed to have various properties of sensitivity and frequency response according to its design but is most useful in frequency range between 1,000 to 50,000 cycles per second. Its increased accuracy and the simplicity and compactness of its construction as compared with the cathode-ray oscilloscope, the only other instrument operative within the above range, make its use highly feasible.

While a preferred embodiment of the invention has been described herein it is to be understood that the invention of this application is not limited to the specific embodiment herein recited but that numerous modifications and variations thereof may be made without departing from the scope of the appended claims.

What is claimed is:

1. A piezoelectro voltmeter comprising in combination, an interference fringe component, a light source and a converging lens system, said interference fringe component comprising a transparent plate having a partially reflecting surface and the chamfered partially reflecting end of an elongated piezoelectric rod, said piezoelectric rod being supported at the end remote from the chamfered end and with the median line of its elongation normal to the surface of said plate and with the chamfered end proximate the adjacent surface of said plate, means for projecting monochromatic light approximately normal to the plate surfaces onto the chamfered end of the piezoelectric crystal, means for impressing an electric voltage potential to be measured upon said piezoelectric crystal, and means for supporting the converging lens system in the path of the light reflected from the interference fringe component, whereby the light reflected from said interference fringe component is focussed to a minute plane area and shifts in proportion to the amplitude of said electric voltage impressed on said piezoelectric crystal thus permitting a calibrated visual observation of the impressed voltage and variations thereof.

2. A film recording piezoelectro voltmeter comprising in combination, an interference fringe component, a light source, and a converging lens system, said interference fringe component comprising a transparent plate having a partially reflecting surface and the chamfered, at least partially reflecting, end of an elongated piezoelectric rod, said piezoelectric rod being supported at the end remote from the chamfered end and with the median line of its elongation normal to the surface of said plate, means for projecting monochromatic light approximately normal to the plate surfaces onto the chamfered end of the piezoelectric crystal, means for impressing a voltage potential to be measured or recorded upon said piezoelectric crystal, and means for supporting the converging lens system in the path of the light reflected from said interference fringe component, whereby the light rays reflected from said interference fringe component are adapted to be focused on a moving film plane to form an interference fringe pattern which shifts laterally in proportion to the amplitude of the impressed voltage across said crystal.

WILLARD E. BUCK.

References Cited in the file of this patent

UNITED STATES PATENTS

| Number | Name | Date |
| --- | --- | --- |
| 1,951,523 | Nicolson | Mar. 20, 1934 |
| 1,954,947 | Pajes | Apr. 17, 1934 |
| 2,455,763 | Harrison | Dec. 7, 1948 |
| 2,518,647 | Teeple | Aug. 15, 1950 |
| 2,534,846 | Ambrose et al. | Dec. 19, 1950 |